(12) United States Patent
Thieffry et al.

(10) Patent No.: US 9,216,800 B2
(45) Date of Patent: Dec. 22, 2015

(54) FLOAT FOR AN OFFSHORE STRUCTURE SUCH AS IN PARTICULAR A WIND TURBINE

(75) Inventors: Philippe Thieffry, Larmor Plage (FR); Jacques Cyrille Moiret, Lanester (FR)

(73) Assignee: DCNS, Paris (FR)

( * ) Notice: Subject to any disclaimer, the term of this patent is extended or adjusted under 35 U.S.C. 154(b) by 0 days.

(21) Appl. No.: 13/824,564

(22) PCT Filed: Jul. 13, 2012

(86) PCT No.: PCT/EP2012/063803
§ 371 (c)(1),
(2), (4) Date: Aug. 20, 2013

(87) PCT Pub. No.: WO2013/010945
PCT Pub. Date: Jan. 24, 2013

(65) Prior Publication Data
US 2014/0109819 A1    Apr. 24, 2014

(30) Foreign Application Priority Data

Jul. 15, 2011 (FR) ..................... 11 56462

(51) Int. Cl.
*B63B 35/44* (2006.01)
*B63B 3/08* (2006.01)
(52) U.S. Cl.
CPC . *B63B 35/44* (2013.01); *B63B 3/08* (2013.01); *B63B 35/4406* (2013.01); *Y02E 10/727* (2013.01)

(58) Field of Classification Search
CPC .......... B63B 35/44; B63B 3/08; B63B 35/42; B63B 35/4406; Y02E 10/727
USPC ........................................ 114/264, 266, 267
See application file for complete search history.

(56) References Cited

U.S. PATENT DOCUMENTS

| | | | | |
|---|---|---|---|---|
| 3,060,463 A | * | 10/1962 | Pentzien | 114/292 |
| 3,785,312 A | * | 1/1974 | Schneider | 114/266 |
| 5,355,825 A | * | 10/1994 | Lefebvre et al. | 114/267 |
| 5,460,114 A | * | 10/1995 | McMillan | 114/267 |
| 6,179,525 B1 | * | 1/2001 | Gruhn et al. | 405/219 |
| 6,374,763 B1 | * | 4/2002 | Hartman | 114/263 |

FOREIGN PATENT DOCUMENTS

| | | |
|---|---|---|
| JP | 9 111734 A | 4/1997 |
| JP | 2001 241374 A | 9/2001 |
| WO | 2005/099377 A2 | 10/2005 |

OTHER PUBLICATIONS

International Search Report issued on Nov. 15, 2012 for International Application No. PCT/EP2012/063803.

* cited by examiner

*Primary Examiner* — Anthony Wiest
(74) *Attorney, Agent, or Firm* — Knobbe Martens Olson and Bear, LLP

(57) ABSTRACT

The invention relates to a float for an offshore structure such as in particular a wind turbine, characterized in that it comprises means in the form of a support beam (1) the exterior surface of which comprises means (2) of attachment for individual buoyancy tanks (3).

7 Claims, 4 Drawing Sheets

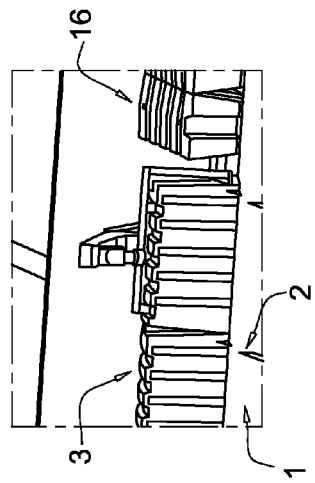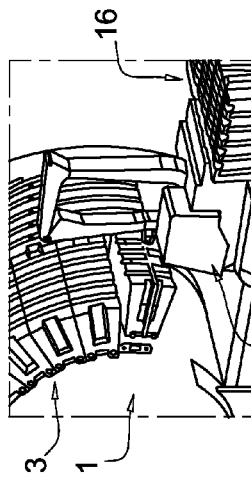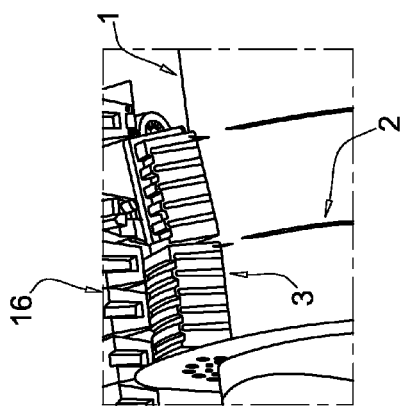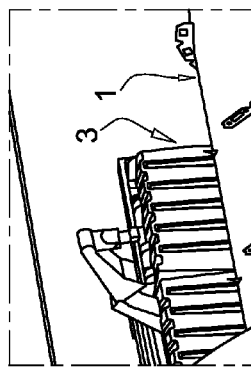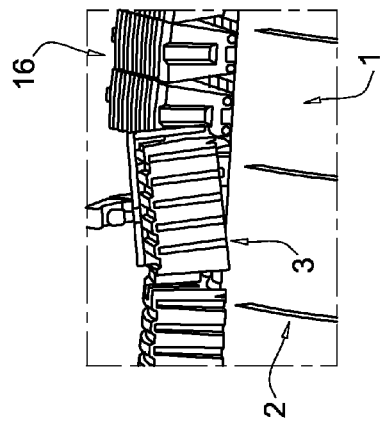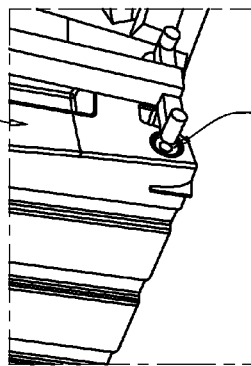

FLOAT FOR AN OFFSHORE STRUCTURE SUCH AS IN PARTICULAR A WIND TURBINE

FIELD OF THE INVENTION

The invention relates to a float for an offshore structure such as in particular a wind turbine.

Such floats may for example be integrated into a floating support unit of an offshore structure such as a wind turbine, which comprises means in the form of a support beam, whose upper part is connected to the structure as for example to a nacelle of the wind turbine and whose lower part is connected to the support means in the form of floats and optionally to means forming the ballast.

A wide variety of floating support units of this type are already known from the state of the art.

BACKGROUND OF THE INVENTION

As a general rule, the means in the form of floats are constructed by way of the assembly and welding of tubes and metal beams of large dimensions making it possible to obtain the level of buoyancy required.

However, it is conceivable that such means in form of floats use a significant amount steel, are relatively difficult to manipulate and to install and represent manufacturing costs that are relatively high on account of the material used and manufacturing method and processes employed.

The purpose of the invention is therefore to solve these problems.

To this end, the purpose of the invention is to provide a float for an offshore structure such as in particular a wind turbine, characterised in that it comprises means in the form of a support beam the exterior surface of which comprises means of attachment for individual buoyancy tanks arranged in layers of individual tanks disposed side by side, these layers of tanks being stacked one on top the other along the means in the form of a beam.

SUMMARY OF THE INVENTION

Based on other characteristic features of the float according to the invention taken alone or in combination:
the tanks are constructed out of plastic material;
the tanks are constructed by the rotation moulding process;
the means of attachment comprise peripheral attachment flanges fixed in a regular manner on the means in the form of a beam and provided with means of attachment of the rear ends of tanks of one layer with the front ends of tanks of the subsequent layer of the stack;
the flanges are adapted so as to engage in transverse housings of the rear ends of tanks of a layer and comprise at least one hole in a position facing a corresponding hole of the rear end of each tank for the passage of a locking member of this rear end of each one of said tanks in position;
the locking member is formed by a locking stud adapted to be engaged in the holes of the tank and of the flange by the rear end of this tank;
the flanges include windows for receiving snugs that are projecting out from the front end of the tanks of the subsequent layer of the stack;
each tank comprises a rib at its front end and a complementary groove at its rear end thereby enabling the press fitting of the tanks of successive layers, one following on the heels of the other, in order to maintain them in position;
the means of attachment and the means in the form of a support beam are fabricated out of metallic material and the means of attachment are welded on to the means in the form of a beam; and
the means in the form of a beam have a circular cross section and the flanges are formed by flanges projecting out radially from these means in the form of a beam.

BRIEF DESCRIPTION OF THE DRAWINGS

The invention shall be better understood with the aid of the description that will follow given solely by way of example and prepared by making reference to the accompanying drawings, wherein:

FIGS. 5 to 16 illustrate the process of assembling—installing of a float according to the invention.

Figure 1:
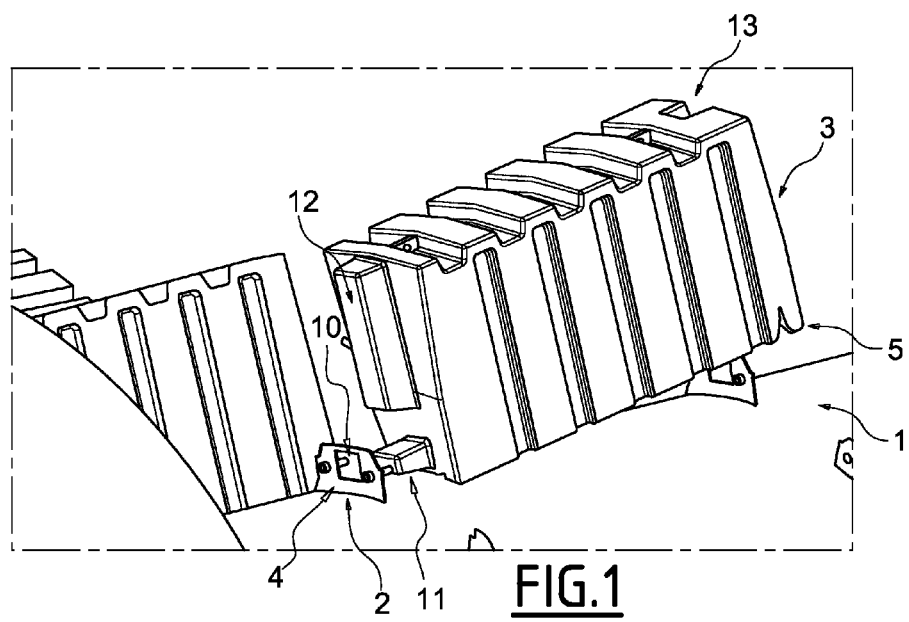
FIG. 1 illustrates the installation of an individual buoyancy tank on the means in the form of a beam being part of the make up of a float according to the invention.

In these figures and in particular in FIG. 1, a float for an offshore structure such as in particular a wind turbine has indeed been illustrated.

DETAILED DESCRIPTION OF THE PREFERRED EMBODIMENT

In a conventional manner such floats may for example be integrated in a floating support unit of an offshore structure such as a wind turbine, which comprises the means in the form of a support beam, whose upper part is connected to the structure as for example to a nacelle of the wind turbine and whose lower part is connected to the means in the form of floats.

The float represented in FIG. 1 includes the means in the form of a support beam designated by the general reference 1, the exterior surface of which comprises the means of attachment for individual buoyancy tanks.

In these figures, the means of attachment are designated by the general reference 2, while an individual buoyancy tank is illustrated and designated by the general reference 3.

In fact, these tanks 3 may be constructed out of plastic material, for example by the rotation moulding process.

As is illustrated in these figures, these tanks are arranged in layers of individual tanks disposed side by side around the means in the form of a beam, these layers of tanks being stacked one on top the other along the means in the form of a beam.

The method of mounting these tanks on the means in the form of a beam shall be described in greater detail in the following sections.

It should be noted however, with regard to FIGS. 1 to 4, that the means of attachment designated by the general reference 2, comprise for example of peripheral attachment flanges, fixed in a regular manner on the means in the form of a beam 1 and provided with the means of attachment of the rear ends of tanks of one layer with the front ends of tanks of the subsequent layer of the stack.

In these figures, a flange is for example designated by the general reference 4.

In fact and as is illustrated, these flanges are adapted so as to engage in transverse housings of the rear ends of tanks of a layer, such as for example the housing designated by the general reference 5 of the tank 3.

These flanges also comprise at least one hole in a position facing a corresponding hole of this end of each tank 3 for the passage of a locking member of this rear end of each one of these tanks in position on the flange.

In the example of the embodiment illustrated in these figures, the flanges include at the level of each attachment area of a tank, two holes respectively 6 and 7 for the passage of locking members which are provided in the form of locking studs 8 and 9.

Figure 3:
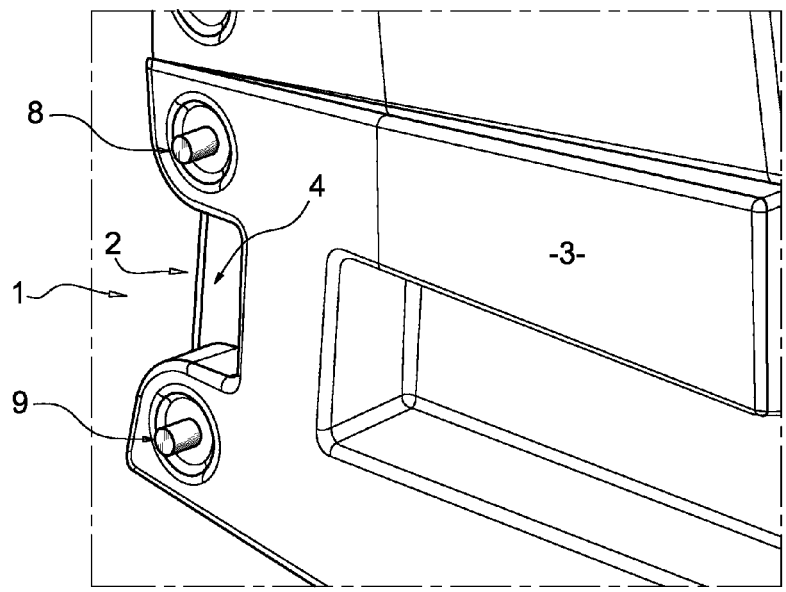
FIGS. 3 and 4 illustrate the attaching of a tank on the means in the form of a beam.
Figure 4:
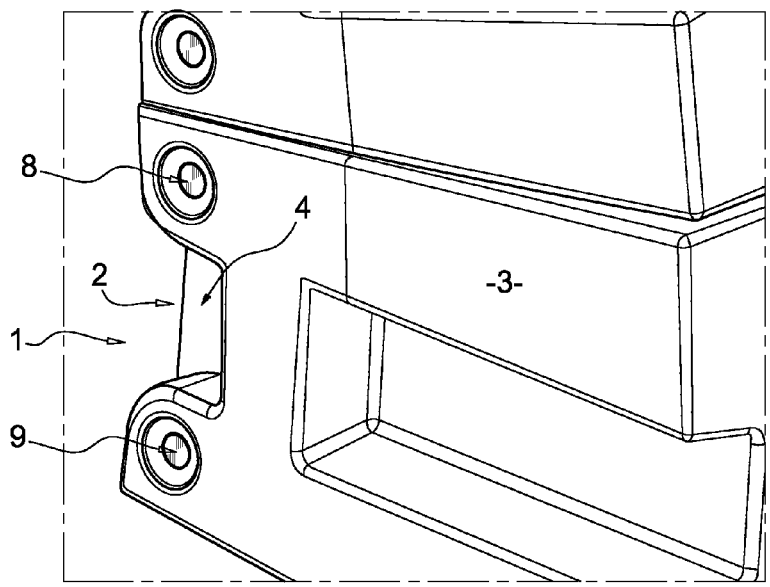
Figure 5:
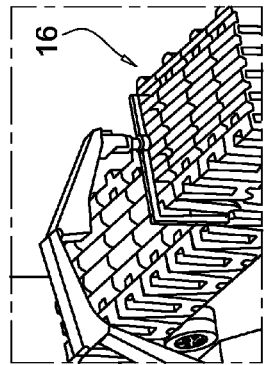
Figure 6:
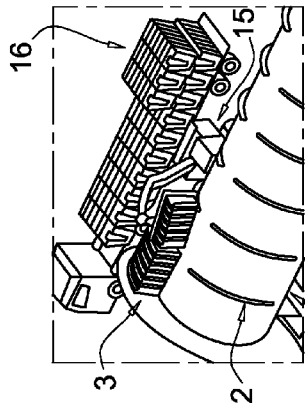
Figure 7:
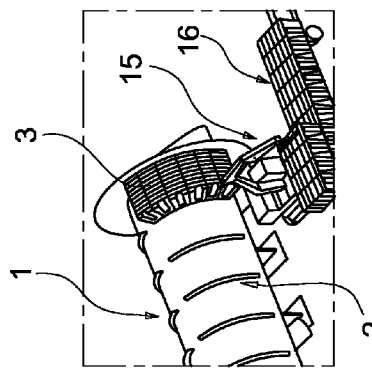
Figure 8:
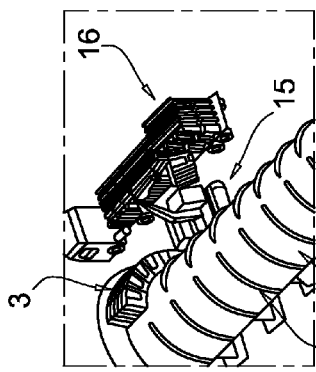
Figure 9:
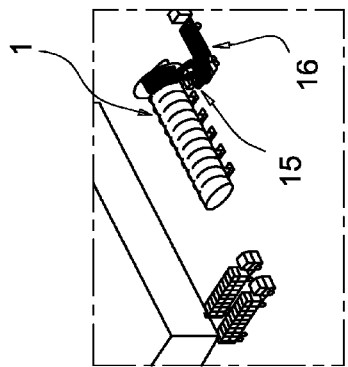
Figure 10:
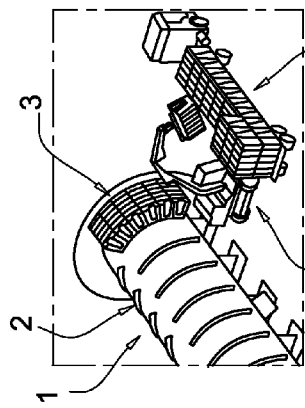

These locking members may then be engaged by an assembly—installation operator in the holes of the tank and of the flange by the rear end of this tank, as is illustrated in FIGS. 3 and 4, so as to lock the tank in position on the corresponding flange of the means in the form of a beam.

Figure 2:
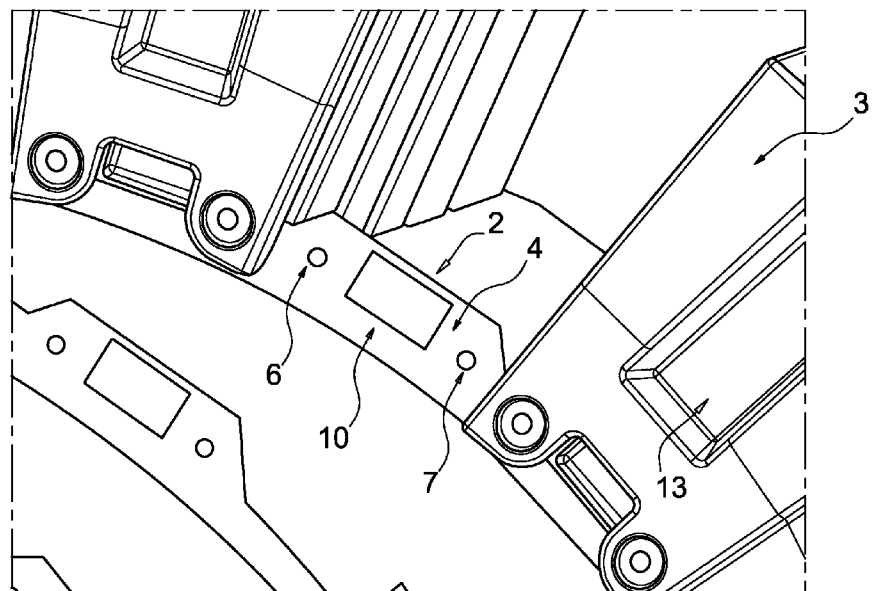
FIG. 2 represents a detailed view of the means of attachment being part of the make up of a float according to the invention.

As is also more clearly visible in FIG. 2, the flanges also include at the level of each attachment area of a tank, a window for receiving a snug that is projecting out longitudinally from the front end of the tanks of the subsequent layer of the stack.

This window is for example designated by the general reference 10 in FIG. 2 and is therefore adapted so as to receive a snug designated by the general reference 11 in the FIG. 1 of a tank and more particularly, a snug that is projecting out from the front end of the latter.

As is also visible in this FIG. 1, each tank comprises at its front end, a rib designated for example by the general reference 12 in this FIG. 1, and at its rear end, a complementary groove 13, thereby enabling the press fitting or nesting of the tanks of successive layers, one following on the heels of the other, in order to maintain them in position.

It should also be note that the means in the form of a beam may be fabricated out of metallic material and that the means of attachment constituted for example by the flanges, may be welded on to the means in the form of a beam.

Of course, various different embodiments of these different means may be envisaged.

Thus the means in the form of a beam may for example have a circular cross section, the flanges then being formed by flanges projecting out radially from these means in the form of a beam.

It is thus conceivable as is visible more clearly in FIGS. 5 to 16, that the means in the form of a beam comprises of flanges of this type distributed in a regular manner along the means in the form of a beam.

The installation of each tank on these means in the form of a beam therefore consists initially in engaging the snug 11 of each of the latter in the corresponding window 10 of the flange 4, then in pressing the rear of the tank 3 flat against the means in the form of a beam, by causing the transverse housing 5 thereof to engage around the flange along the means in the form of a beam.

The assembly—installation operator may then push the locking studs 8 and 9 into position in the holes of the tank and the holes 6 and 7 of the flange in order to lock the tank into position on the means in the form of a beam.

This operation of assembly—installation of a tank may then be repeated as is illustrated in FIGS. 5 to 16, in order to position the tanks side by side about the means in the form of a beam and thereby form layers of tanks along these means in the form of a beam.

These layers of tanks are then stacked one on top of the other along these means in the form of a beam.

This is for example implemented in such a manner and as illustrated in FIGS. 5 to 16, by using appropriate material handling equipment such as for example the equipment unit designated by the general reference 15 in these figures.

The individual tanks are then for example delivered in the assembly—installation area on a trailer or other similar unit, such as that designated by the general reference 16 in these figures.

The operator may then use the material handling equipment to remove the individual tanks from the trailer and to install them in place on the means in the form of a beam, and this may be done in a simple and fast manner.

As this has been previously indicated, this presents a number of advantages in comparison to the structures of floats indicated in the state of the art, particularly in terms of weight, cost and ease of handling and installation.

The invention claimed is:

1. Float for an offshore structure, comprising a support beam of circular cross section, the exterior surface of which comprises a device configured to attach individual buoyancy tanks arranged in layers of individual buoyancy tanks disposed side by side, the layers of tanks being stacked one on top of the other along the beam, the device configured to attach individual buoyancy tanks comprising a plurality of peripheral attachment flanges evenly fixed and projecting outwardly from a periphery of the beam and configured for the attachment of rear ends of the tanks of one layer and of front ends of the tanks of a subsequent layer of the stack, wherein the flanges are adapted so as to engage in transverse housings of said rear ends of the tanks of one layer and comprise at least one hole in a position facing a corresponding hole of said rear end of each tank for the passage of a locking member for locking the rear end of each one of said tanks in position.

2. Float according to claim 1, wherein the tanks are constructed out of plastic material.

3. Float according to claim 1, wherein the tanks are constructed by a rotation moulding process.

4. Float according to claim 1, wherein the locking member is formed by a locking stud adapted to be engaged in the holes of the tank and of the flange by the rear end of said tank.

5. Float according to claim 1, wherein the flanges include windows for receiving snugs that are projecting out from the front end of the tanks of the subsequent layer of the stack.

6. Float according to claim 1, wherein each tank comprises a rib at its front end and a complementary groove at its rear end, thereby enabling pressed fitting of the tanks of successive layers, one following on the heels of the other, in order to maintain them in position.

7. Float according to claim 1, wherein the device configured to attach individual buoyancy tanks and the support beam are fabricated out of metallic material and the device configured to attach individual buoyancy tanks are welded on to the beam.

\* \* \* \* \*